US010625439B2

(12) United States Patent
Ogden et al.

(10) Patent No.: US 10,625,439 B2
(45) Date of Patent: Apr. 21, 2020

(54) SYSTEM AND METHOD FOR OPTIMIZING THE MANUFACTURE OF WOODEN PANELS

(71) Applicant: Michael Weinig, Inc., Mooresville, NC (US)

(72) Inventors: Karl Ogden, Charlotte, NC (US); Russell Hass, North Wilkesboro, NC (US); Jason F. Howell, Mooresville, NC (US); Daniel Dew, Mooresville, NC (US)

(73) Assignees: MICHAEL WEINIG, INC., Mooresville, NC (US); RFSPROTECH LLC, Matthews, NC (US)

( * ) Notice: Subject to any disclaimer, the term of this patent is extended or adjusted under 35 U.S.C. 154(b) by 1751 days.

(21) Appl. No.: 14/174,823

(22) Filed: Feb. 6, 2014

(65) Prior Publication Data
US 2015/0217475 A1    Aug. 6, 2015

(51) Int. Cl.
  *B27M 1/08*   (2006.01)
  *B27M 3/18*   (2006.01)
  *B27M 3/00*   (2006.01)
  *G05B 19/418* (2006.01)

(52) U.S. Cl.
  CPC ............ *B27M 1/08* (2013.01); *B27M 3/0053* (2013.01); *B27M 3/18* (2013.01); *G05B 19/41805* (2013.01); *Y10T 156/1062* (2015.01)

(58) Field of Classification Search
  CPC .................................. B27M 1/08; B27M 3/18
  See application file for complete search history.

(56) References Cited

U.S. PATENT DOCUMENTS 6,561,238 B2 *  5/2003  Knighten .................. B27F 5/12
                                                144/2.1

* cited by examiner

*Primary Examiner* — Matthew Katcoff
(74) *Attorney, Agent, or Firm* — Shumaker, Loop & Kendrick, LLP; Patrick B. Horne

(57) ABSTRACT

Embodiments of the invention are directed to systems, methods and computer program products for optimizing wood panel creation. An exemplary apparatus is configured to receive information related to a customer order; assemble, based at least partially on the received information, a plurality of wooden staves; adhere the plurality of wooden staves to one another such that a ribbon of staves is formed; position the ribbon of staves on a first conveyor belt such that it is transferred to a portion of the device for curing; cure the ribbon of staves using the fourth unit of the production device; resize such that a panel is formed, wherein resizing the ribbon of staves comprises removing an excess portion of the ribbon of staves; and return the excess portion of the ribbon of staves on a second conveyor belt to another unit of the production device.

18 Claims, 5 Drawing Sheets

SYSTEM AND METHOD FOR OPTIMIZING THE MANUFACTURE OF WOODEN PANELS

BACKGROUND

When manufacturing various products, such as cabinet doors in the kitchen cabinet industry, it is often desirable to incorporate one or more panels in the design of the product. These panels can be made from a solid piece of material or built from multiple pieces of materials. One successful approach to form panels involves adhering together a collection of wooden staves having a rectangular cross-section in an edge-to-edge configuration. For example, wooden staves having a thickness of one inch and a width of two inches can be adhered together along their narrower edges to create a raised panel of a cabinet door.

Traditionally, individual wooden staves may be assembled using clamp racks clamp racks in which panels are clamped so that the individual panel segments can be glued together. Those familiar with the art will recognize that the individual staves used to form the assembly rarely combine to form the exact width required for the assembled panel and hence are subjected to a secondary operation(s) in which the assembled width is resized to the requirement and the excess discarded else stored by length and material type for integration back into the formulation process at a later time, resulting in excessive inventory and/or wasted material.

Thus there is a need in the industry for a means to create an assembly from a plurality of wooden staves and immediately recover any residual waste.

BRIEF SUMMARY

Embodiments of the invention are directed to systems, methods, and computer program products that provide for the optimization of lumber press processes.

A system for optimizing wood panel creation includes a memory; a processor; and a module stored in the memory, executable by the processor, and configured to receive information related to a customer order, wherein the customer order requires the production of at least one job, and wherein the information comprises job instructions to produce at least one wood panel using one or more production devices; position, based at least partially on the received information, the ribbon of staves on a first conveyor belt, wherein the first conveyor belt is coupled with a third and fourth unit of the production device, and wherein the ribbon of staves is positioned at the third unit and transferred to the fourth unit using the first conveyor belt; resize, based at least partially on the received information, the ribbon of staves using the fourth unit of the production device such that a panel is formed, wherein resizing the ribbon of staves comprises removing an excess portion of the ribbon of staves; and return at least some of the excess portion of the ribbon of staves on a second conveyor belt to the third unit of the production device, wherein the second conveyor belt is at least partially coupled with the fourth unit production device.

In some embodiments, the system is further configured to assemble, based at least partially on the received information, a plurality of wooden staves using a first unit of a production device.

In some embodiments, the system is further configured to adhere the plurality of wooden staves to one another such that a ribbon of staves is formed using a second unit of the production device.

In some embodiments, the system is further configured to cure the ribbon of staves using the fourth unit of the production device.

In some embodiments, the system is further configured to position, at the third unit of the production device, the ribbon of staves on the first conveyor belt using a first fence, wherein the first fence is automatically adjusted based at least partially on the received information, and wherein the first fence is coupled with the third unit of the production device.

In some embodiments, the system is further configured to position, at the fourth unit of the production device, the ribbon of staves on the first conveyor belt using a second fence, wherein the second fence is automatically adjusted based at least partially on the received information, and wherein the second fence is coupled with the fourth unit of the production device.

In some embodiments, the system is further configured to facilitate assembly, based at least partially on the received information, a second plurality of wooden staves, wherein the second plurality of wooden staves comprises the excess portion of the ribbon of staves such that the excess potion of the ribbon of staves is assembled with the second plurality of wooden staves after being returned on the second conveyor belt; and facilitate adhering the second plurality of wooden staves to one another such that a second ribbon of staves is formed.

In some embodiments, the system is further configured to remove the excess portion of the ribbon of staves using a saw coupled with the fourth production device.

In some embodiments, the production device comprises a laser, and wherein the laser is at least partially coupled with the third and fourth units of the production device.

In some embodiments, the job instructions specify a required width for the panel, and wherein the laser projects a line, on the ribbon of staves, that distinguishes the required width for the panel from the excess portion of the ribbon of staves.

In some embodiments, the job instructions specify a required width for the at least one panel.

In some embodiments, the system is further configured to oversize the plurality of wooden staves such that the width of the ribbon of staves is greater than the required width of the at least one panel.

According to embodiments of the invention, a method for optimizing wood panel creation includes receiving information related to a customer order, wherein the customer order requires the production of at least one job, and wherein the information comprises job instructions to produce at least one wood panel using one or more production devices; positioning, based at least partially on the received information, the ribbon of staves on a first conveyor belt, wherein the first conveyor belt is coupled with a third and fourth unit of the production device, and wherein the ribbon of staves is positioned at the third unit and transferred to the fourth unit using the first conveyor belt; resizing, based at least partially on the received information, the ribbon of staves using the fourth unit of the production device such that a panel is formed, wherein resizing the ribbon of staves comprises removing an excess portion of the ribbon of staves; and returning at least some of the excess portion of the ribbon of staves on a second conveyor belt to the third unit of the production device, wherein the second conveyor belt is at least partially coupled with the fourth unit production device.

In some embodiments, the method also includes assembling, based at least partially on the received information, a plurality of wooden staves using a first unit of a production device.

In some embodiments, the method also includes adhering the plurality of wooden staves to one another such that a ribbon of staves is formed using a second unit of the production device.

In some embodiments, the method also includes curing the ribbon of staves using the fourth unit of the production device.

According to embodiments of the invention, a computer program product for optimizing wood panel creation includes a non-transitory computer-readable medium comprising a set of codes for causing a computer to receive information related to a customer order, wherein the customer order requires the production of at least one job, and wherein the information comprises job instructions to produce at least one wood panel using one or more production devices; position, based at least partially on the received information, the ribbon of staves on a first conveyor belt, wherein the first conveyor belt is coupled with a third and fourth unit of the production device, and wherein the ribbon of staves is positioned at the third unit and transferred to the fourth unit using the first conveyor belt; resize, based at least partially on the received information, the ribbon of staves using the fourth unit of the production device such that a panel is formed, wherein resizing the ribbon of staves comprises removing an excess portion of the ribbon of staves; and return at least some of the excess portion of the ribbon of staves on a second conveyor belt to the third unit of the production device, wherein the second conveyor belt is at least partially coupled with the fourth unit production device.

In some embodiments, the computer program product further comprises a set of codes for causing a computer to position, at the third unit of the production device, the ribbon of staves on the first conveyor belt using a first fence, wherein the first fence is automatically adjusted based at least partially on the received information, and wherein the first fence is coupled with the third unit of the production device.

In some embodiments, the computer program product further comprises a set of codes for causing a computer to position, at the fourth unit of the production device, the ribbon of staves on the first conveyor belt using a second fence, wherein the second fence is automatically adjusted based at least partially on the received information, and wherein the second fence is coupled with the fourth unit of the production device.

In some embodiments, the computer program product further comprises a set of codes for causing a computer to cure the ribbon of staves using the fourth unit of the production device.

BRIEF DESCRIPTION OF THE DRAWINGS

Figure 1:
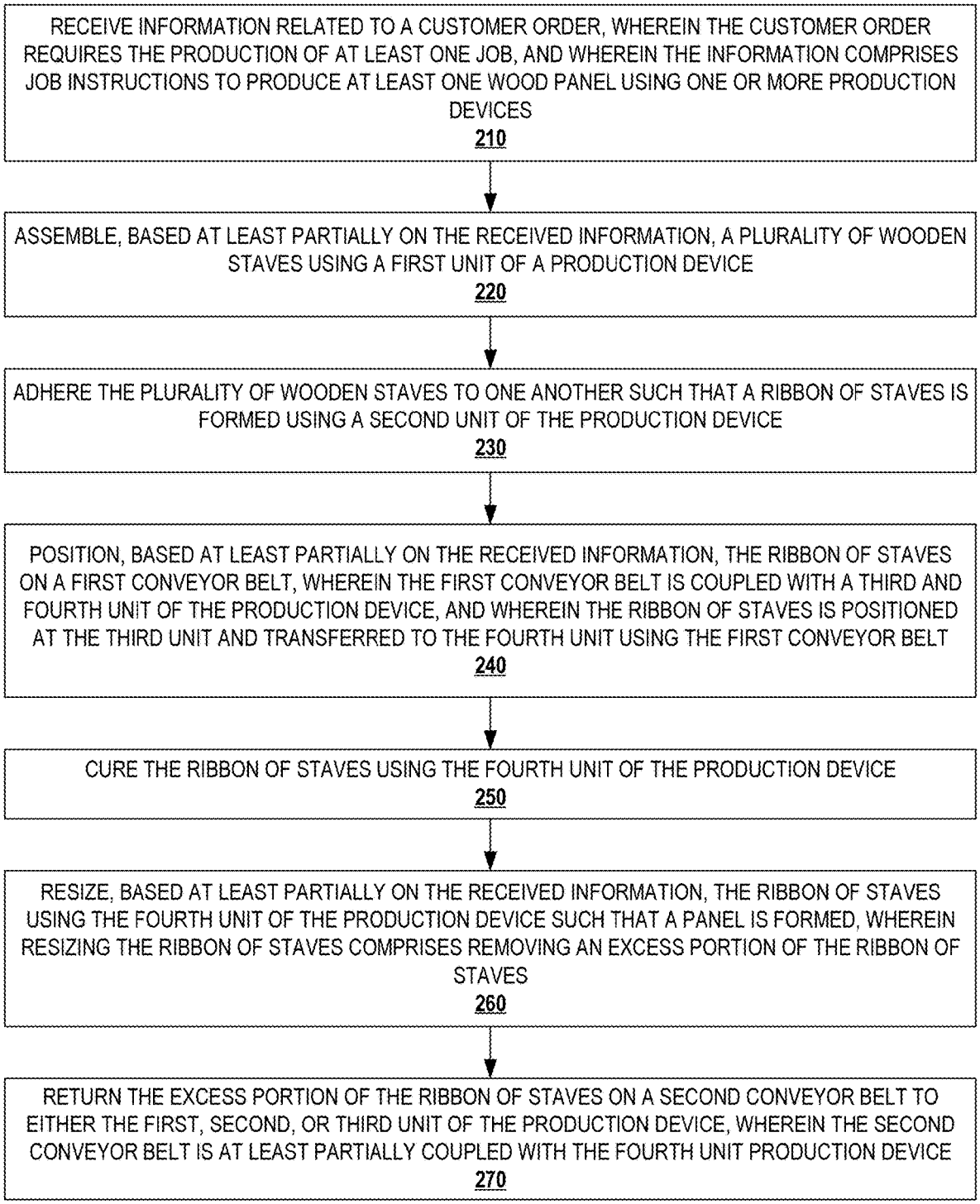
Figure 2:
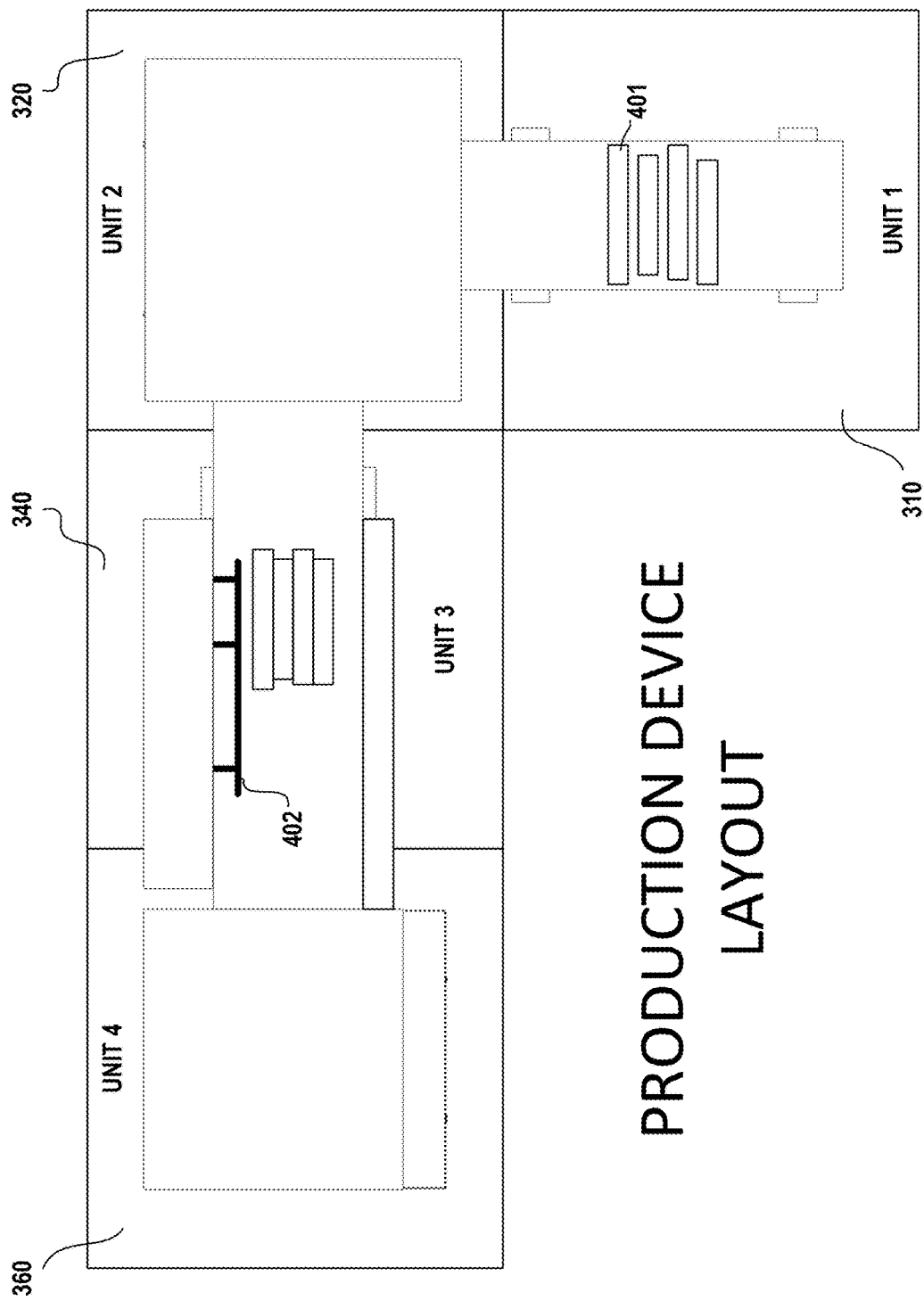
Figure 3A:
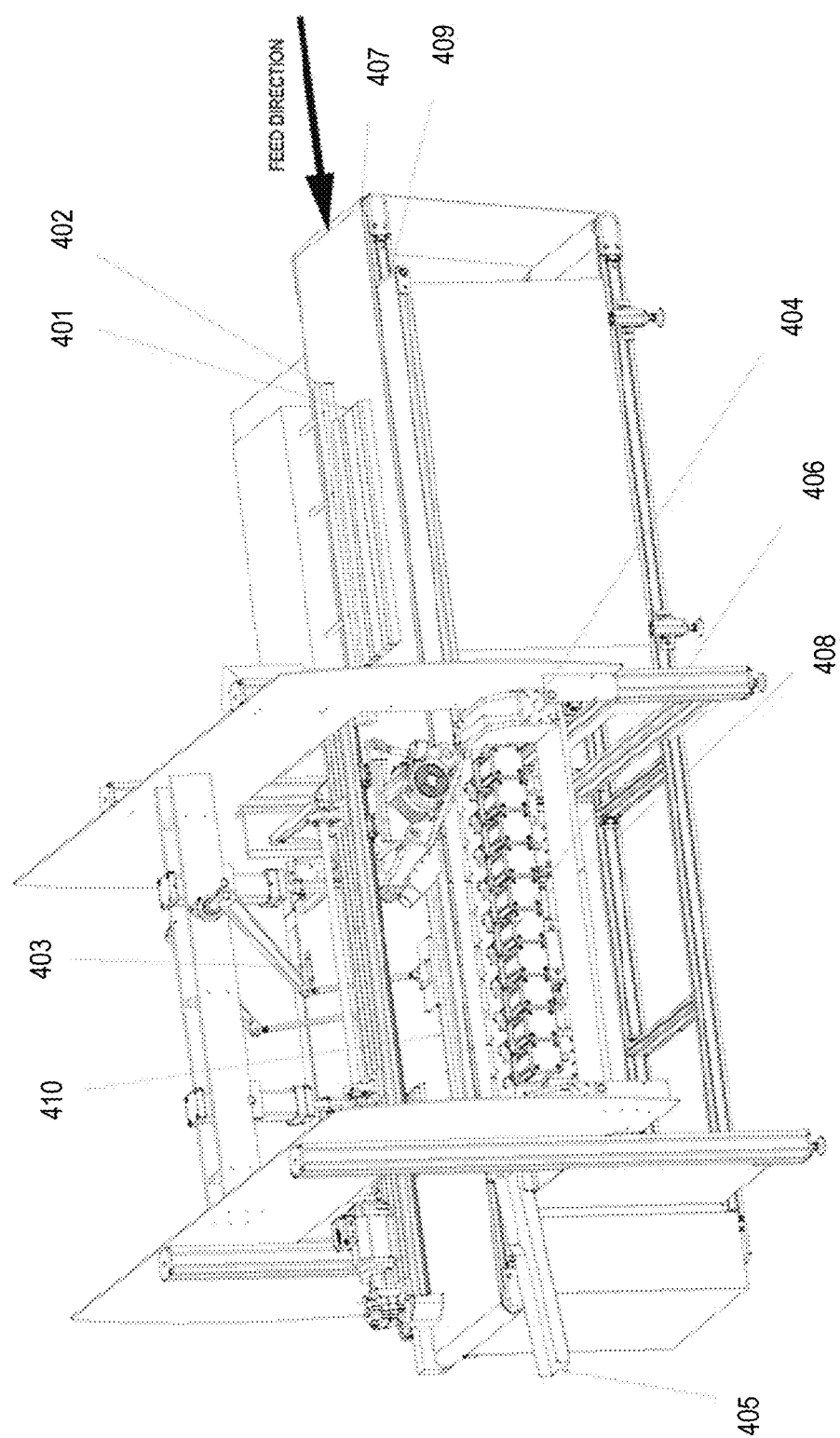
Figure 3B:
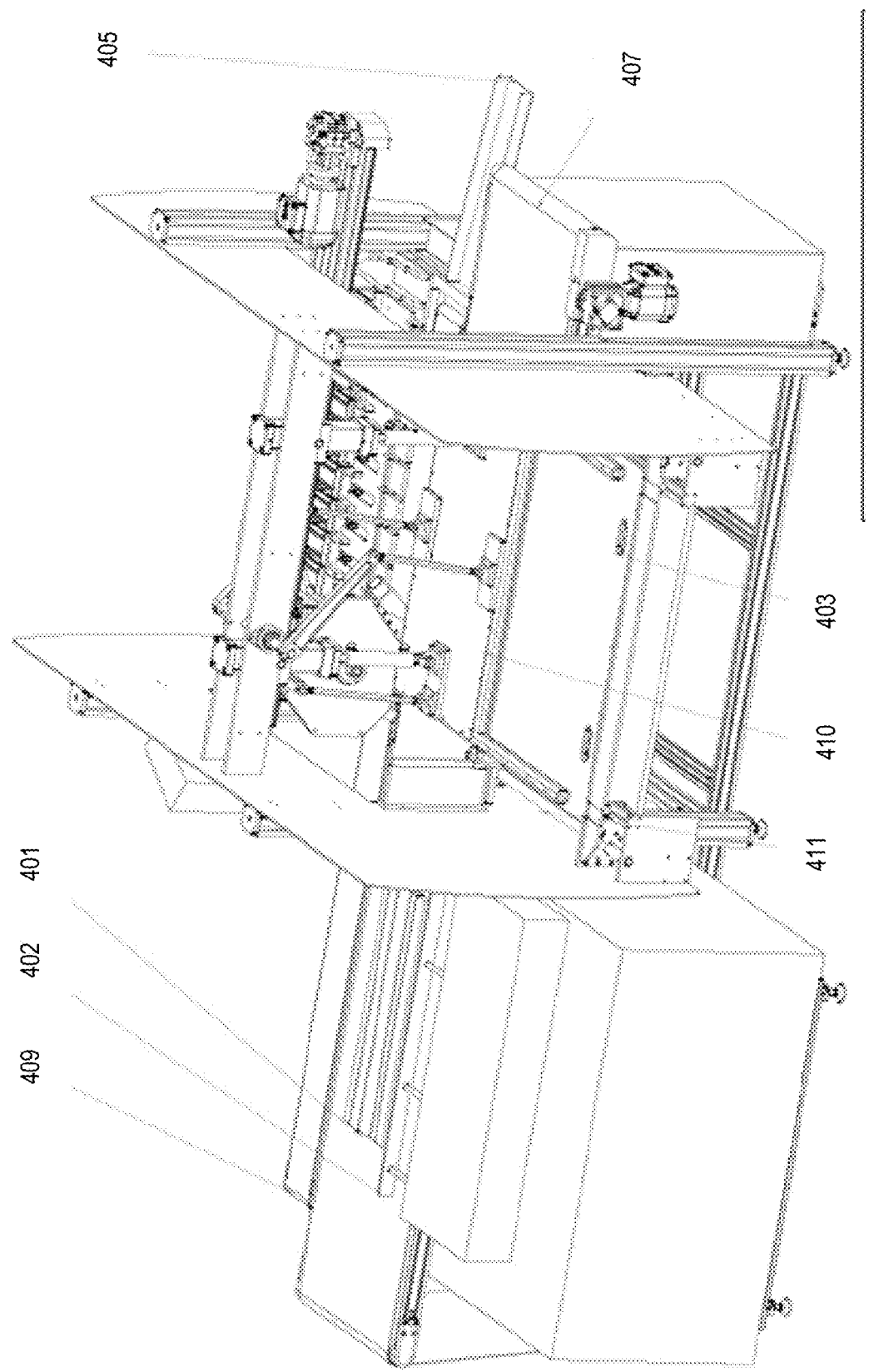
Figure 4:
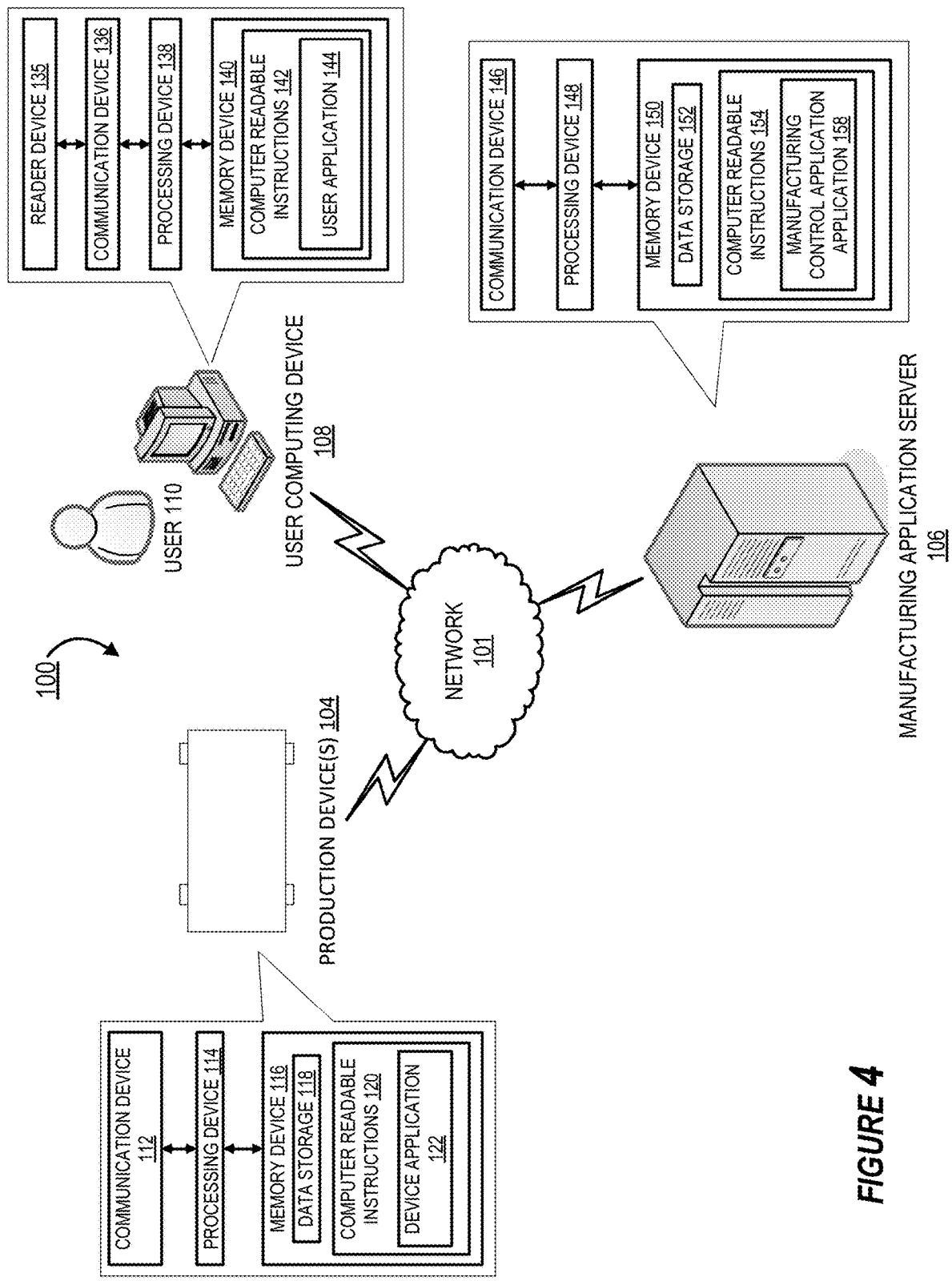

Having thus described embodiments of the invention in general terms, reference will now be made to the accompanying drawings, where:

FIG. 1 provides a flow diagram illustrating a method for optimizing the manufacture of wooden panels, in accordance with embodiments of the present invention;

FIG. 2 provides a layout illustrating a layout of a production device for optimizing the manufacture of wooden panels, in accordance with embodiments of the present invention;

FIG. 3A provides a front side perspective view of an apparatus for use in optimizing the manufacture of wooden panels, in accordance with embodiments of the present invention;

FIG. 3B provides a rear side perspective view of an apparatus for use in optimizing the manufacture of wooden panels, in accordance with embodiments of the present invention; and FIG. 4 provides a diagram illustrating a manufacturing control system, in accordance with embodiments of the present invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. However, it may be evident that such embodiment(s) may be practiced without these specific details. Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Where possible, any terms expressed in the singular form herein are meant to also include the plural form and vice versa, unless explicitly stated otherwise. As used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Furthermore, as used herein, an "operator" refers to an individual in a manufacturing or production facility that is in charge of the management and operation of machine tools, equipment, management of supply, partially manufactured and/or completely manufactured inventories, or any combination of the aforementioned. It should be noted that the terms "operator" and "user" may be used interchangeably throughout the specification. It should be further noted that any of the method steps discussed herein may be executed either manually by an operator of the production device and/or automatically using a software component associated with the production device. Also, as used herein, the term "species" shall mean one or more types of wood that may be used by a manufacturer (e.g. poplar, maple, oak, cherry, mahogany and the like). A "job" as used herein may refer to the production of one or more goods. In addition, the term "order" is used herein to denote any request submitted to request the manufacture of components such as solid wooden cabinet panels.

The present invention provides systems, methods, and computer programs products for optimizing the manufacture of wooden panel assemblies from a plurality of wooden staves. Embodiments of the invention combine several steps traditionally performed independently of one another and systematically execute the steps with the use of a single system. For the purposes of the embodiments described herein, the system may refer to a plurality of stations that each perform at least one of the steps described herein and are coupled to at least one other station. The system comprises a production device which includes at least a layup station, and a pressing station with integrated sawing capabilities and conveyance for both residual return to the layup station or otherwise to the exit end of the production device for resized components. The present invention provides a user friendly and space efficient design that provides for easy integration into the automated in-feed and out-feed of other manufacturing systems.

In exemplary embodiments, the system allows for automatic or manual gluing of wooden panels to be cured and trimmed at a later time within the process. For example, at a first layup station, either an operator or the apparatus itself matches wooden staves according to several factors such as the color, grain, and/or species of wood, and glues the staves together to create a single wooden panel. The staves may vary in length and/or width. As used herein, the terms "stave" and/or "lamella" may refer to a narrow strip of wood. Furthermore, with the use of a bar coding and/or labeling system, the system provides for automatic adjustments of the apparatus based on the required panel measurements for a particular job. For example, at a second layup station, an automatic fence on an in-feed of the press may set up automatically according to the required panel width for a job. Likewise, a corresponding adjustable back stop fence within the interior of the press may also automatically position itself according to the required panel width, thereby eliminating the use of filler blocks when processing panels of varied widths. Also, the system provides for rapidly curing a glued panel after panels have been fed into the press. A complete feed and rip may take less than sixty (60) seconds thus delivering faster cycle times. Once the panel is pressed and cured, the oversized stock of the panel may be trimmed to width with a saw that is built into the press. The remaining waste or oversized portion of the panel may then be dropped onto a conveyor belt and transferred back to an operator to be re-introduced with the next panel being assembled on the in-feed table. The system is capable of optimizing the use of excess lumber during the process for resizing the panel. As a result, the methods of the present invention accomplish optimum lumber yield.

In a specific example, an operator located at a first layup station matches several wood staves according to the color, grain, and species required for a specific job. The staves are then glued together to form a single wood panel. The wood panel is transferred to a second layup station located at the in-feed of the press device, where an in-feed fence is automatically adjusted according to the required length of the wood panel. The panel is then entered into the press device on a first conveyor belt, where a second back stop fence inside of the press automatically positions according to the panel width, and the panel is cured within seconds of entering the press device. The device then resizes the panel and returns the excess wood on a second conveyor belt. The excess wood is received by an operator and applied to a subsequent panel being prepared for processing.

Now referring to FIG. 1, FIG. 1 provides a flowchart illustrating a method 200 for optimizing wood panel creation according to embodiments of the invention. As represented by step 210, the system first receives information that is related to a customer order requiring the production of at least one job. In an exemplary embodiment, the information comprises job instructions to produce at least one wood panel using one or more productions devices such as a wood press device. The information may be received either manually from an operator using various data entry methods or automatically utilizing either software or a manufacturing control system component associated with the production device.

In some embodiments, the system may receive information related to the customer order via a verbal command. For example, the production device may be configured to receive verbal commands from an operator of the production device such that the system subsequently receives information related to the customer order.

In some embodiments, the system may receive information related to the customer order manually from an operator of the production device. In one embodiment, manually receiving information from an operator of the production device may comprise the operator utilizing an interface and/or input device associated with the production device such as a keyboard and/or touch-screen display. For example, the operator may receive a hard-copy of the customer order information and manually input the information related to the customer order into the production device such that the system subsequently receive information related to the customer order. In another example, the input device may be a "start" button associated with the production device such that receiving information related to the customer order comprises the operator selecting and/or pressing the start button such that the system receive a command to begin initializing the production of the customer order.

In another embodiment, manually receiving information from an operator of the production device may comprise the operator manually setting up one or more components of the production device based at least partially on information provided via a hard-copy of the customer order. For example, the operator may receive a hard-copy of the customer order information and manually set up one or more component of the production device according to specifications detailed in the hard-copy of the customer order such that the system subsequently receive information related to the customer order.

In yet another embodiment, receiving information may comprise scanning a barcode where the barcode may be manually scanned by an operator of the production device or electronically using a software component associated with the production device. For example, an individual barcode may be located on each wooden stave required for the production of the customer order such that each barcode is scanned prior or during the wooden stave being initially introduced to the production device.

To this extent, in one embodiment, the production device may electronically communicate with an external manufacturing control system in order to receive the job instructions. The manufacturing control system may comprise one or more components for communicating with the production device, such as an application server and/or user input device. As illustrated in FIG. 4, the application server 106 is operatively coupled, via a network 101, to the production device 104, and to the user computing device 108. It should be noted that the production device may include one or more production devices, such as mechanical devices, machinery and the like. It should be further noted that the terms "user computing device" and "user computing system" may be used interchangeably throughout the specification. In this way, the application server 106 can send information to and receive information from the production device 104 and the user computing device 108 to effectively manage the manufacturing process.

Communication between the application server 106 and the production device 104 may be established in various ways. For example, in one embodiment, the production device 104 may be a wood press machine. In one specific embodiment of the system, initiating a connection for communication between the wood press machine and other system components may be executed using three software components or modules. A first software component may be associated with the wood press machine such that the software is stored in the memory device 116 and executed by the processing device 114. A second software component may be associated with the application server such that the software is stored in the memory device 150 and executed by the processing device 148.

In one embodiment, establishing a connection for communication may comprise establishing a socket connection. The production device 104 may establish a socket connection with one or more software components stored on the application server 106 by initiating a request for a connection. Upon retrieval of the request, the second software component may create an instance to the data such that the application server 106 boots an instance of a third software component associated with the production device 104 server. To this extent, the production device 104 and application server 106 may establish a client server connection. For example, when the production device wishes to establish a connection, the first software component may send a first character string to the second software component. The first character string may be any alphanumeric combination which requests a new connection between two communication devices. In response to receiving the first character string the second software component may then boot an instance of an executable server file. In one embodiment, the executable server file may exist in the same folder as the second software component. Once the third software component is booted successfully with a connection to the database, it may send its current port setting to the second software component.

The first software component may retain its connection to the second software component until it receives a second character string. The second character string may be any alphanumeric combination which indicates a port number-representing the new port for the first software component to make its connection to the third software component. The first software component may then disconnect from the second software component and establish a connection to the third software component via the new port setting. The third software component may wait a period of time, such as thirty (30) seconds, for the connection to be established. In one embodiment, if there is no connection for a consecutive thirty (30) seconds, the third software component will terminate itself. Once the connection is established between the first software component and the third software component, the data is then accessible for the first software component.

Miscellaneous instructions may be sent to and received from the application server 106. Miscellaneous instructions sent to the application server 106 may include, but is not limited to, package printing instruction, package identification instructions and machine identification information. Miscellaneous instructions received from the application server 106 may include instructions to provide a display message. The instructions may also be accompanied with an associated port number. It should be noted that, in addition to communicating with the application server 106, production devices 104 may also communicate directly with one or more additional production devices and the user computing device 108. In one embodiment, the application server 106 can send order and/or job information to and receive information from a plurality of production devices 104. As such, the application server 106 may function as a central communication point for controlling the lineal moulding process. For example, the application server 106 may receive a plurality of orders 612 and may communicate instructions, associated with processing the order, to the production devices 104. FIG. 4 illustrates only one example of an embodiment of a system environment 100, and it will be appreciated that in other embodiments, one or more of the systems, devices, or servers may be combined into a single system, device, or server, or be made up of multiple systems, devices, or servers.

The network 101 may be a global area network (GAN), such as the Internet, a wide area network (WAN), a local area network (LAN), or any other type of network or combination of networks. The network 101 may provide for wireline, wireless, or a combination of wireline and wireless communication between devices on the network. In some embodiments, the user 110 is an individual employed by a manufacturing company and tasked with overseeing the manufacturing process. One or more orders may be made by a plurality of customers online or offline, over the phone, at a merchant's place of business and/or by other transaction means such that the orders are received at the application server 106 and displayed on the user computing device 108. The order may be made by a customer using a computing device or mobile computing device (i.e. smart phone, PDA, etc.) or other types of systems that communicate with the application server 106 to allow the manufacturer to receive and process an order. In other embodiments, the user 110 may access an order stored on the application server 106 and make changes to the order using the user computing device 108 such that the changes are saved in the application server 106 and the updated order information is simultaneously communicated to the production devices 104. In some embodiments, the user 110 may be an operator, employee, agent, independent contractor, etc. acting on behalf of the manufacturer to process a job.

As illustrated in FIG. 4, the application server 106 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101, such as, but not limited to the user computing device 108 and the production device(s) 104. As such, the communication device 146 generally comprises a modem, server, or other device for communicating with other devices on the network 101.

As further illustrated in FIG. 4, the application server 106 comprises computer-readable instructions 154 stored in the memory device 150, which in one embodiment includes the computer-readable instructions 154 of an application 158. In some embodiments, the memory device 150 includes data storage 152 for storing data related to customer orders and/or manufacturing information including but not limited to data created and/or used by the application 158 or the user 110. The data storage 152 may also store real-time update information for production device(s), manufacturer inventory, order history, production statistics and the like.

In the embodiment illustrated in FIG. 4 and described throughout much of this specification, the manufacturing control application 158 allows the user 110 to interact with the system. First, manufacturing control application 158 allows a user 110 to interact with the customer orders and manage the production process, via the production device 104. Next, the application 158 allows the user 110 to receive real-time updates related to the status of a job and/or a plurality or orders. Both sending and receiving job and/or order information may be performed by a using an interface, such as a user interface associated with production device 104 or user computing device 108, provided from the application 158 via a network 101.

In some embodiments, the manufacturing control application 158 allows the user 110 to communicate with the production device 104, to indicate manual changes in the production process. This communication may be in the form of text communications, voice communications, or the like. Typically, the production process is controlled by instructions created via the application server 106, but in some instances the user may interject and manually alter the production process. The manufacturing control application 158 may receive manufacturing information related to a job via the user computing device 108. The user 110 may also use the user computing device 108 to query the real-time status of an order and/or job.

The jobs may be associated with one or more customer orders. This is largely due to the high efficiency that is yielded when grouping one or more orders for production. In this way, the orders are produced as a single job versus individually. In a specific embodiment, the order may be grouped based on like species.

The user 110, through the user computing device 108, may provide the manufacturing control application 158 data with respect to product manufacturing. The manufacturing control application 158 may then store the data related to the user input such as, but not limited to order cancellations, order amendments, etc. In this way, the manufacturing control application 158 may have access to all real-time information being received by the user. In an instance that the priority rank has been changed the manufacturing control application 158 may queue updated instructions to be sent to the production devices 104. In one embodiment, the manufacturing control application 158 may detect a favorable combination of order component that will further optimize the production in light of the updated instructions.

The manufacturing control application 158 may also receive data from the user computing device 108. The manufacturing control application 158 may determine an optimal production plan for manufacturing the plurality of orders 612. The data stored within the manufacturing control application 158 provides computer readable instructions 154 to the processing device 148 to allow for the production of a plurality of jobs associated with one or more orders 612 received by multiple customers. The manufacturing control application 158 stores statistics related to successful job executions as well as statistics related to the efficiency of the overall system.

As illustrated in FIG. 4, the user computing device 108 generally comprises a reader device 135, a communication device 136, a processing device 138, and a memory device 140. The reader device 135 is operatively coupled to the processing device 138, communication device 136, and the memory device 140. The user computing device 108 may include a reader device 135 to receive order information from the user 110. Such a reader device 135 may include a magnetic strip reader, a barcode scanner, a radio frequency (RF) reader, a character recognition device, a magnetic ink reader, a processor for interpreting codes presented over an electrical or optical medium, a biometric reader, a wireless receiving device, and/or the like. In some embodiments, the reader device 135 receives information that may be used to manage the overall production process and communicates the information via the communication device 136 over a network 101, to other systems such as, but not limited to the application server 106 and/or the production device(s) 104. As such, the communication device 136 generally comprises a modem, server, or other device for communicating with other devices on the network 101.

As further illustrated in FIG. 4, the user computing device 108 comprises computer-readable instructions 142 stored in the memory device 140, which in one embodiment includes the computer-readable instructions 142 of a user application 144. A user computing device 108 may refer to any device used to interact with the application server 106, either from the operator's perspective, the manufacturer's perspective or both. In some embodiments, the user computing device 108 may refer only to a user's device, in other embodiments it refers only to a plurality or user devices, and in yet other embodiments, it refers to both a user device interacting with other devices to perform a job. For example, in one embodiment, the user computing device 108 refers to the user computing device configured to communicate with a production device 104, whereas in other embodiments, the user computing device 108 refers to the production device 104 configured to communicate with a user computing device 108, and in yet other embodiments, the user computing device 108 refers to both the user computing device and the production device(s) 104 configured to communicate with each other to carry out a job. In one embodiment, the user computing device 108 may be a kiosk or special terminal for managing orders.

In some embodiments, a user computing device 108 is or includes an interactive computer terminal that is configured to initiate, complete, and/or facilitate one or more real-time order activations. A user computing device 108 could be or include any device that a user may use to interact with the application server 106, such as, but not limited to, a contactless device (e.g., a key fob), a radio frequency identification device (RFID) and the like, a computer, (e.g., a personal computer, tablet computer, desktop computer, server, laptop, etc.), a mobile device (e.g., a smartphone, cellular phone, personal digital assistant (PDA) device, MP3 device, personal GPS device, etc.), a merchant terminal, a self-service machine (e.g., vending machine, self-checkout machine, etc.), a public and/or business kiosk (e.g., an Internet kiosk, ticketing kiosk, etc.), a gaming device, and/or various combinations of the foregoing.

In some embodiments, a user computing device 108 is operated in a manufacturing warehouse. In other embodiment, the user computing device 108 may be operated remotely such that the user computing device 108 is not located in the manufacturing facility. In accordance with some embodiments, the user computing device 108 is not owned by the operator of the user computing device 108. Rather, in some embodiments, the user computing device 108 is owned by a manufacturing company. In yet other embodiments, the user computing device 108 is owned by a third party providing functionality to facilitate and manage a manufacturing process in accordance with embodiments of the invention described herein.

In the embodiment illustrated in FIG. 4, the user application 144 allows the user computing device 108 to be linked to the application server 106 to communicate, via a network 101. Information related to the order being made, such as the customer name, quoted cost of the order, quantity, sizes, species and the like may be displayed on the user computing device 108. The user application 144 may provide the manufacturing control application 158 with user input related to the manufacturing process, such that the manufacturing control application 158 may determine an optimal plan for manufacturing a plurality of orders 612.

The user application 144 may also receive information from the application server 106. The user application 144, in some embodiments, may receive an order from the manufacturing control application 158, such that they user application 144 may display the order to the user 110 on a display on the user computing device 108. In this way, the user 110 may receive an option to alter an order that the system is already in the process of manufacturing. The order may be displayed on the user computing device 108 such that the user 110 may make changes to the order in real-time as the order is being produced.

FIG. 4 also illustrates a production device 104. The production device 104 may include a communication device 112, a processing device 114, and a memory device 116. The processing device 114 is operatively coupled to the communication device 112 and the memory device 116. The processing device 114 uses the communication device 112 to communicate with the network 101 and other devices on the network 101, such as, but not limited to the user computing device 108, the application server 106. As such, the communication device 112 generally comprises a modem, server, or other device for communicating with other devices on the network 101.

As further illustrated in FIG. 4, the production device 104 may include computer-readable instructions 120 stored in the memory device 116, which in one embodiment includes the computer-readable instructions 120 of a device application 122. A production device 104 may be or include any mechanical device and/or machinery, such as a wood press machine, or other machinery including, but not limited to moulder(s), cross cut saws, rip cut saws, coping machines, forklifts, or the like. Although only a single production device 104 is depicted in FIG. 2, the system environment 10 may contain numerous production devices 104.

In some embodiments, the order may be related to a general wood manufacturing job such as an order for a kitchen cabinet that requires the production of several kitchen cabinet cells. As such, the information received may additionally include, but not be limited to, information such as the customer name(s), quote, contact information, amount(s), order quantity, sizes, profiles, species, category(s), thickness, width, cost per board foot (BF) and the like. The order information may be received either online and/or offline, via telephone, at a merchant's place of business and/or by other transaction means such that the order(s) are submitted electronically to the application server 106. In another embodiment, the order may be submitted as a blueprint such that the application server analyzes the blueprint, identifies the dimensions associated with each room, and determines the necessary materials to complete such an order. In one embodiment, orders are received in a manner that completely eliminates a paper trail. For example, orders may be directly transmitted, electronically, from the customer to the application server 106. To this extent, the elimination of a paper process increases the accuracy of order information as the user 110 is not required to manually enter order information into the system. Orders may be received by means of email, electronic forms, website interface(s), mobile applications and the like.

In some embodiments job instructions are derived from the customer order itself. Thus the job instructions may be determined by the system, based at least partially on the customer order, after the order has been received. For example, in some embodiments, after an order has been received, the order may be analyzed and used as a basis to create job instructions for producing the order. The job instructions may then be transmitted to one or more production device(s) via the network 101.

In one embodiment, a cumulative instruction list that comprises job instructions for a number of production devices is sent to one or more production devices 104. In such an embodiment, the production device(s) may be configured to extract from the job instructions the specific steps related to its designated piece of machinery. For example, the job may require three pieces of machinery. The three pieces of machinery may include a wood press device, a curing device, and a saw. As such, the instructions may comprise a first set of steps to be executed by the wood press device, a second set of steps to be executed by the curing device, and a third set of steps to be executed by the saw. The cumulative instructions, including all three sets of steps, may be sent to the three pieces of machinery. Upon receiving the instructions the wood press device may extract the first set of steps, the curing device may extract the second set of steps, and the saw may extract the third set of steps such that each machine is aware of the role it plays in the overall production process with respect to all the production devices 104 involved in the manufacturing a job.

In some embodiments, a single machine may comprise more than one production devices. For example, a radio frequency slat bed press may comprise a wood press, curing device, and saw within the single piece of machinery. In this embodiment, a single machine may receive cumulative instructions the can be device into sub-steps associated with each production device within the single piece of machinery. To this extent, the individual instructions are not necessarily extracted from the cumulative instructions set, but are instead subdivided after being received by the single piece of machinery and allocated to the respective production devices.

In another embodiment, the application server 106 is configured to separate the job instruction list and send specific components of the job instructions to the exact machine intended to execute the specific portion of instructions. For example, the job may require three pieces of machinery. The three pieces of machinery may include a wood press device, a curing device, and a saw. As such the instructions may comprise a first set of steps to be executed by the wood press device, a second set of steps to be executed by the curing device, and a third set of steps to be executed by the saw. In such an embodiment, the first set of steps are sent to the wood press device, the second set of steps are sent to the curing device, and the third set of steps are sent to the saw such that each piece of machinery only receives instructions that are specific to the task that it must execute and the application server 106 maintains a master list of the job instructions containing all the steps to be executed by each production device 104. Upon receiving job instructions, one or more steps may be executed by the production device based at least partially on the information provided in the job instructions. The job instructions may also be executed based at least partially upon information that is manually entered by the user 110.

As represented by step 220, in some embodiments, the method further comprises assembling, based at least partially on the received information, a plurality of wooden staves using a first unit of the production device. It should be noted that as discussed herein, the necessary steps for accomplishing method 200 may be performed automatically by a production device within the system or manually by a user or operator associated with at least one production device within the system.

In an exemplary embodiment, the wooden staves are assembled in a lineal orientation using a first unit of the production device 310. As illustrated in FIG. 2, in one embodiment, the first unit of the production device 310 may be rectangular in shape. To this extent, the plurality of wooden staves may be assembled horizontally with respect to the width of the first unit of the product device 310 such that the wooden staves are aligned parallel to one another along the length of the first unit of the production device 310. It should be noted, while the illustrated embodiments depict the plurality of wooden staves being arranged in a lineal orientation, the wooden staves may also be arranged in other orientations including, but not limited to, several other non-lineal orientations based at least partially on the job instructions provided in the received information. In some embodiments, the first unit of the production device comprises an apparatus configured to receive and/or collect one or more wooden staves from a material stock pile and arrange the wooden staves on a flat surface associated with the first unit of the production device 310 with respect to the job instructions provided in the received information.

In some embodiments, assembling the plurality of wooden staves further comprises matching the wooden staves with one another based at least partially on the received information, where the received information specifies one or more instructions for matching the plurality of wooden staves according to their color and/or grain. It should be noted that in exemplary embodiments, the wooden staves are assembled with matching colors with the grain; however, in some embodiments, the instructions may specify that a job requires the wood to be assembled with mismatched colors and/or the wood be matched against the grain, across the grain, or with respect to the end grain. In some embodiments, the first unit of the production device comprises an apparatus configured to match one or more wooden staves according to color and/or grain and arrange the wooden staves on a flat surface associated with the first unit of the production device 310 with respect to the job instructions provided in the received information. In some embodiments, the apparatus may be configured to determine whether or not the wood grain associated with a wooden stave is straight. Determining whether or not the wood grain is straight may comprise the apparatus determining whether or not the grain runs in a single direction that is parallel with respect to the axis of a tree. In some embodiments, the apparatus may be configured to determine whether or not the wood grain associated with a wooden stave is spiral. Determining whether or not the wood grain is spiral may comprise the apparatus determining whether or not the grain runs in a spiral direction with respect to the axis of a tree. In some embodiments, the apparatus may be configured to determine whether or not the wood grain associated with a wooden stave is interlocked. Determining whether or not the wood grain is interlocked may comprise the apparatus determining whether or not the grain runs in a spiral direction with respect to the axis of a tree and regularly reverses its direction in an alternating fashion.

In some embodiments, the plurality of wooden staves is assembled based on a reference beam. Where the reference beam may be a laser that beams onto a flat surface of the first unit of the production device and conveys the minimum amount of material that is required for the production of the panel. For example, the laser beam may define the four wooden staves, illustrated in FIG. 2, as being the amount of materials required to produce the proper panel width for the customer order.

In some embodiments, assembling the plurality of wooden staves further comprises labeling the plurality of wooden staves using the first unit of the production device 310. In one embodiment, the wooden staves are labeled with a form of visual indicia (e.g. barcode, Quick response code, hologram, etc.). The visual indicia may provide various information to either the system itself and/or an operator associated with the system. For example, in one embodiment, the visual indicia may identify the orientation in which the wooden staves should be arranged such that when the wooden staves are arranged in the correct fashion the visual indicia displays a number or letter across the plurality of wooden staves. In some embodiments labeling the plurality of wooden staves with a form of visual indicia further comprises labeling the plurality of wooden staves with a Quick Response (QR) code that may be later scanned by other units within the production device such that the QR code relays job instructions that were initially provided at the first unit of the production device 310.

As represented by step 230, after the plurality of wooden staves have been assembled they are then adhered to one another using a second unit of the production device 320. To this extent, assembling the plurality of wooden staves may further comprise transferring the assembled wooden staves from the first unit of the production device 310 to the second unit of the production device 320 such that the staves are in their prior assembled orientation upon reaching the second unit of the production device, as illustrated in FIG. 2. After adhering the wooden staves to one another they may instead form a ribbon of staves and/or solid panel, where the ribbon of staves is embodied by a collectively adjoined wooden panel comprised of the individually assembled wooden staves that are not connected to one another. In one embodiment, the loose staves are glued at the edges of one another to form the panel.

The wooden staves may be adhered to each other using various forms of adhesive, including but not limited to, glue, cement, paste and the like. It should be noted that adhering the wooden staves to one another may comprise the use of other binding techniques such as sewing, welding, bolting, screwing, and/or the like, where these binding techniques may be used in addition to or in alternate of the use of adhesive. In an exemplary embodiment, adhering the plurality of wooden staves to one another using adhesive comprises gluing the plurality of wooden staves to one another. In some embodiments, the second unit of the production device 320 comprises an apparatus configured to receive the plurality of wooden staves from the first unit of the production device 310 and glue the wooden staves together such that a ribbon of staves is formed. In one embodiment, the staves are glued together one piece at a time. In another embodiment, a plurality of wooden staves may be simultaneously glued together. In an exemplary embodiment, the wooden staves are glued together with respect to one or more longitudinal edges associated with the staves such that gluing the wooden staves together comprises one or more steps, including but not limited to, applying glue to at least one edge of a first wooden stave, adhering at least one edge of a second wooden stave to the at least one edge of the first wooden stave, and removing any excess glue using various methods (e.g. sanding)

In some embodiments, prior to adhering the plurality of wooden staves to one another the second unit of the production device 320 may be additionally configured to verify that the wooden staves were accurately matched and assembled by the first unit of the production device. In the instance that an error occurred during the initial assembly process the second unit of the production device may either send the plurality of wooden staves back to the first unit of the production device 310 to be reassembled or it may correct the error by reassembling the staves itself. In some embodiments, the received information may indicate based at least partially on the degree of the error whether or not the wooden staves should be reassembles at the first or second unit of the production device. For example, the second unit of the production device 320 may determine that the received plurality of wooden staves are erroneously matched, the received information may specify that matching errors be corrected at the first unit of the production device 310 such that the second unit of the production device 320 transfers the plurality of wooden staves back to the first unit. In another embodiment, the second unit of the production device may determine that the received plurality of wooden staves cannot be efficiently glued due to a curved edge on one or more staves, the received information may specify that such an error be corrected at the second unit of the production device 320 such that the second unit of the production device may be coupled with one or more tools (e.g. a saw) for self-correcting the error prior to gluing the staves together.

As represented by step 240, after being formed, the ribbon of staves is positioned on a first conveyor belt based at least partially on the received information. In an exemplary embodiment, the first conveyor belt may be coupled with a third and fourth unit of the production device such that the ribbon of staves id positioned at the third unit and transferred to the fourth unit using the first conveyor belt, as illustrated in FIG. 2. In an exemplary embodiment the third unit of the production device 340 comprises an automatic fence for positioning the ribbon of staves. The automatic fence may be located on an in-feed of a press associated with the production device. In an exemplary embodiment, the third unit of the production device 340 is embodied by an in-feed for supplying materials to the fourth unit of the production device 360. As used herein the term "in-feed" and phrase "third unit of the production device" may be used interchangeably and similarly refer to reference number 340.

The in-feed may include several components, including but not limited at least a portion of the first conveyor belt of the production device, and the automatic fence. In some embodiments, the automatic fence on the in-feed of the press will set up automatically according to the required panel width. As illustrated, in an exemplary embodiment, the surface of the in-feed may be rectangular in shape such that the automatic fence is position parallel with respect to the length of the rectangular surface of the in-feed and moves backwards and forwards along the width of the surface such that a ribbon of staves may be adjusted with respect to the width of the surface. In some embodiments, the ribbon of staves may be transferred from the third unit of the production device to the fourth unit of the production device in response to an operator selecting a start button that initializes that transfer and movement of the first conveyor belt.

In some embodiments, positioning the ribbon of staves on the first conveyor belt may further comprise receiving, at the third unit of the production device 340, the ribbon of staves from the second unit of the production device 320. In some embodiments, positioning the ribbon of staves using the automatic fence comprises first scanning a QR code or another form of visual indicia labeled on the ribbon of staves such that upon scanning the QR code the third unit of the production device receives information previously associated with the QR code, where the received information comprises instructions for adjusting the automatic fence. For example, the ribbon of staves may be first transferred by the second unit of the production device 320 to the third unit of the production device 340. Upon being received a QR code or other form of visual indicia labeled on the ribbon of staves may be read using a scanner or visual indicia reader coupled with the third unit of the production device 340. As a result the third unit of the production device may receive information such as the required width of the panel to be produced and may transfer the information to the automatic fence such that it adjusts itself accordingly.

As represented by step 250, after being transferred to the fourth unit of the production device 360, the ribbon of staves is cured using the fourth unit of the production device 360. Prior to curing the ribbon of staves, the fourth unit of the production device 360 may be configured to receive, via the first conveyor belt, the ribbon of staves from the third unit of the production device. To this extent, the fourth unit of the production device 360 may comprise an adjustable back stop fence that corresponds to the automatic fence of the third unit of the production device 340. The corresponding adjustable back stop fence may be located inside of the press associated with the fourth unit of the production device such that it automatically positions according to the panel width, thereby eliminating the use of filler blocks when processing panels of varied widths.

In an exemplary embodiment, the fourth unit of the production device 360 comprises a Radio Frequency (RF) press that provides instant drying and/or curing. To this extent, in some embodiments, the cycle time for curing the ribbon of staves may be at least sixty (60) seconds or less. In an exemplary embodiment, the adhesive is cured as a function of adhesive, time, pressure and method of heating if any. In some embodiments, the radio frequency may be applied to the joints of the ribbon of staves. The system may use the RF energy to heat and accelerate the cure cycle. Those familiar with the art will recognized that a variety of heating methods can be utilized, so it should be noted, while the exemplary embodiments use RF technology for use in curing the wooden staves other methods of curing may be used in combination with or in alternative to the RF technology such methods may include, but not be limited to, steam, radiant, heat, microwave, air drying, kiln drying, seasoning and the like.

In some embodiments, the fourth unit of the production device is configured to execute one or more steps involving curing the ribbon of the staves. The one or more steps may include but not be limited to, initiating the curing process for a wooden stave, monitoring the moisture content of the wooden staves, and determining whether or not the ribbon of wooden stave is cured based at least partially on the monitored moisture content. The unit may additionally terminate the curing process for the wooden stave if it is determined that the moisture content is below a predetermined threshold, where the predetermined threshold may be specified by the system itself, an operator of the production device, and/or specified in the received information.

As represented by step 260, after the ribbon of staves has been cured, the ribbon of staves may be resized based at least partially on the received information. The ribbon of staves may be resized using the fourth units of the production device 360 such that a panel is formed. In an exemplary embodiment, resizing the ribbon of staves comprises removing any excess portions of the ribbon of staves with respect to the received information. As used herein, an excess portion of the ribbon of staves may refer to any oversized stock in addition to the required width of the panel.

Removing an excess portion of the ribbon of staves may comprise trimming the oversized stock on the panel to the required width using one or more tools and/or apparatuses associated with the fourth unit of the production device 360. In one embodiment, the fourth unit of the production device comprises a saw (e.g. a flying cut of saw) for use in resizing the ribbon of staves. In some embodiments, the saw may be built into a press associated with the fourth unit of production device.

As represented by step 270, after the ribbon of staves has been resized according to a required width for the order, the excess portion of the ribbon of staves may be returned to either the first, second, or third unit of the production device for reintroduction into the manufacturing process. In an exemplary embodiment, the excess portion of the ribbon of staves is returned, to another unit of the production device, on a second conveyor belt that is at least partially coupled to the fourth unit of the production device. For example, the excess portion may be dropped onto the second conveyor belt and transferred directly to another unit of the production device or to the operator who may re-introduce the remainder back with the next plurality of staves being assembled either on the in-feed surface or the first unit of the production device 310. The production device may additionally comprise a laser beam extending from the third unit of the production device to the fourth unit, where the laser may function as a guide for the operator to note where the cut will be made and ensure there is sufficient overage for return. In one embodiment, the laser beam may broadcast a beam that is parallel to the second conveyor belt 409. In an exemplary embodiment, the laser beam is placed in a fixed position such that it is aligned with the cutting location of the beam saw 412. For example, in one embodiment, the laser beam may be positioned along the outer edge of the ribbon of staves, illustrated in FIG. 2, such that the system further verifies that the materials will be beneath the beam saw 412 when transferred to the fourth unit of the production device. However, in other embodiments, the laser beam may be automatically or manually adjusted based on the received information related to the customer order.

In some embodiments, after resizing the ribbon of staves the excess portion of the ribbon of staves may be cut to one or more additional widths or sub-components required for the customer order and may be placed on an out-feed shoot 405 of the production device versus being reintroduced into the process via the second conveyor belt.

Now referring to FIG. 3, comprised of FIGS. 3A and 3B, FIG. 3A provides a front side perspective view, and FIG. 3B provides a rear side perspective view of an apparatus for use in optimizing the manufacture of wooden panels, in accordance with embodiments of the present invention. As illustrated in Figured 3, an adjustable layup fence 402 is used as a location mechanism. The fence is positioned utilizing acme screws and a powered motor drive with position feedback to an integral control station. In some embodiments, the operator may scan a barcoded document which contains dimensional information for the assembled products and the control system may locate the fence 402 and other related components to the required position. In some embodiments, an operator or automated in-feed device may apply adhesive to and positions individual wooden staves 401 against the layup fence 402 and on top of the first conveyor belt 407. Those familiar with the art will recognize that more than one layup can be simultaneously processed and the number of layups processed may be dependent upon the length of the wooden staves 401 and length of layup fence 402.

As further illustrated in FIG. 3, the press associated with the press station may comprise a top platen 410. In some embodiments, the Feed belt 407 may index the ribbon of staves under the top platen 410. The top platen 410 may then lower the press fence 403, driven by press fence locating screws 411, and pressure beam 408, driven by pressure beam locating screws 404, index to a location predetermined by the control system and based upon the size of the product being processed. The pressure cylinders 406 may extend and provide lamination force onto the ribbon of staves.

Once the panel is cured pressure cylinders 406 and pressure beam 408 may retract to their original position. The top platen 410 may retract and the press fence 403 may index to a location based upon the dimensions of the product being manufactured and the location of the beam saw 412. The top platen 410 may extend and clamp the ribbon of staves against the feed belt 407. The beam saw 412 may then activates and saws the ribbon of staves to width. A second conveyor belt 409 may function as a means for reclaiming and returning unused products and transport the unused material back to the layup area for use in the next assembly. If the assembly is at the final required width, the top platen 410 may retract and the first conveyor belt 407 may transport the finish assembly to an exit end and out of the production device.

Those familiar with the art will recognize that when producing assemblies of a small final width that increased production can be realized by laying up the ribbon of staves in multiples and then cutting the multiple assemblies to the final width(s). Thus in an alternate embodiment, the system achieves this capability by repeating the positioning of the ribbon of staves with the press fence 403, clamping the ribbon of staves with the top platen 410, and sawing the ribbon of staves with the beam saw 412 such that the second conveyor belt 407 is run in a direction towards an out-feed of the press and transfers finished assemblies to a cut to width out-feed chute 405.

As will be appreciated by one skilled in the art, aspects of the present embodiments of the invention may be embodied as a system, method or computer program product. Thus, embodiments of the present invention are described herein with reference to flowchart illustrations and/or block diagrams of methods, systems, and computer program products. Like numbers refer to like elements throughout. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

The steps and/or actions of a method or algorithm described in connection with the embodiments disclosed herein may be embodied directly in hardware, in a software module executed by a processor, or in a combination of the two. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present embodiments of the invention may take the form of a computer program product embodied in one or more computer readable medium(s) having computer readable program code embodied thereon.

A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

If implemented in software, the functions may be stored or transmitted as one or more instructions or code on a computer-readable medium. Computer-readable media includes both computer storage media and communication media including any medium that facilitates transfer of a computer program from one place to another. Any combination of one or more computer readable medium(s) may be utilized. The computer readable medium may be a computer readable signal medium or a computer readable storage medium. A storage medium may be any available media that can be accessed by a computer. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

These computer program instructions may also be stored in a computer-readable medium that can direct a computer or other programmable data processing apparatus to function in a particular manner, such that the instructions stored in the computer readable memory produce an article of manufacture including instruction means which implement the function/act specified in the flowchart and/or block diagram block(s). Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

According to various embodiments of the invention, a computing device used by a user has a memory device configured to store computer-executable code and a processing device in communication with the memory device. The processing device is configured to execute computer-executable code stored on the memory device to communicate with one or more production interfaces, the one or more production interfaces associated with one or more mechanical devices and/or machinery used in the production process. In some embodiments, it also provides the user with options to activate, change, and/or prioritize orders that have been received. In some embodiments, it also provides the user information regarding the current status of one or more orders. In some embodiments, it also provides the user an option of seamlessly managing the production of one or more jobs associated with a plurality of orders.

According to some embodiments of the invention, a processing device of the computing device is configured to access a plurality of orders stored in the memory device, and analyze each order to determine what is needed to produce the order and how the orders can be combined into one job that will optimize the resources and materials being used. In some such embodiments, the computing device also determines whether multiple orders can be combined into one batch or job.

As used herein, a "memory device" or "memory" generally refers to a device or combination of devices including one or more forms of non-transitory computer-readable media for storing instructions, computer-executable code, and/or data thereon. Computer-readable media is defined in greater detail herein below. It will be appreciated that, as with the processing device, each communication interface and memory device may be made up of a single device or many separate devices that conceptually may be thought of as a single device.

Although embodiments of the invention described herein are generally described as involving a manufacturing entity, it will be understood that this invention may involve one or more persons, organizations, businesses, merchants and/or other institutions, services providers etc. that implement one or more steps, one or more processes, and/or one or more portions of one or more of the embodiments described and/or contemplated herein, and/or or one or more steps or processes not described herein.

While the foregoing disclosure discusses illustrative embodiments, it should be noted that various changes and modifications could be made herein without departing from the scope of the described aspects and/or embodiments as defined by the appended claims. Additionally, all or a portion of any embodiment may be utilized with all or a portion of any other embodiment, unless stated otherwise. Furthermore, while certain exemplary embodiments have been described and shown in the accompanying drawings, it is to be understood that such embodiments are merely illustrative of and not restrictive on the broad invention, and that this invention is not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

Although many embodiments of the invention have just been described above, the invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the invention described and/or contemplated herein may be included in any of the other embodiments of the invention described and/or contemplated herein, and/or vice versa. In addition, where possible, any terms expressed in the singular form herein are meant to also include the plural form and/or vice versa, unless explicitly stated otherwise.

What is claimed is:

1. A system for optimizing wood panel creation, the system comprising:
    a computing device comprising a memory; a processor; and a module stored in the memory, executable by the processor, and configured to receive information related to a customer order, wherein the customer order requires the production of at least one job, and wherein the information comprises job directions to produce at least one wood panel using at least one production device;
    at least one production device comprising a first conveyor belt, a second conveyor belt, a third unit, and a fourth unit, wherein the first conveyor belt is coupled between the third unit and the fourth unit and the second conveyor belt is coupled between the fourth unit and the third unit;
    wherein the first conveyor belt is programmed to receive instructions at least partially based on the received information from the computing device and to position, based on the received instructions the ribbon of staves at the third unit and transfer the ribbon of staves to the fourth unit;
    wherein the fourth unit is programmed to receive instructions at least partially based on the received information from the computing device and to resize, based on the received instructions the ribbon of staves such that a panel is formed, wherein resizing the ribbon of staves comprises removing an excess portion of the ribbon of staves; and
    wherein the second conveyor belt is programmed to receive instructions at least partially based on the received information from the computing device and return, based on the received instructions, at least some of the excess portion of the ribbon of staves from the fourth unit to the third unit of the production device.

2. The system of claim 1, wherein the at least one production device comprises a first unit programmed to receive instructions at least partially based on the received information from the computing device and to assemble, based at least partially on the received instructions, a plurality of wooden staves.

3. The system of claim 1, wherein the at least one production device comprises a second unit programmed to receive instructions at least partially based on the received information from the computing device and to adhere, based at least partially on the received instructions, the plurality of wooden staves to one another such that a ribbon of staves is formed.

4. The system of claim 1, wherein the fourth unit is programmed to receive instructions at least partially based on the received information from the computing device and to cure, based at least partially on the received instructions, the ribbon of staves.

5. The system of claim 1, further comprising a first fence, and wherein the system is programmed position, at the third unit of the production device, the ribbon of staves on the first conveyor belt using the first fence, wherein the first fence is automatically adjusted based at least partially on the received information, and wherein the first fence is coupled with the third unit of the production device.

6. The system of claim 1, further comprising a second fence, and wherein the system is programmed to position, at the fourth unit of the production device, the ribbon of staves on the first conveyor belt using the second fence, wherein the second fence is automatically adjusted based at least partially on the received information, and wherein the second fence is coupled with the fourth unit of the production device.

7. The system of claim 1, wherein the system is further programmed to:
facilitate assembly, based at least partially on the received information, a second plurality of wooden staves, wherein the second plurality of wooden staves comprises the excess portion of the ribbon of staves such that the excess potion of the ribbon of staves is assembled with the second plurality of wooden staves after being returned on the second conveyor belt; and
facilitate adhering the second plurality of wooden staves to one another such that a second ribbon of staves is formed.

8. The system of claim 1, further comprising a saw coupled with the fourth production device and the system is programmed to remove the excess portion of the ribbon of staves using the saw.

9. The system of claim 1, wherein the at least one production device comprises a laser, and wherein the laser is at least partially coupled with the third and fourth units of the production device.

10. The system of claim 1, wherein the job directions specify a required width for the panel, and wherein the laser projects a line, on the ribbon of staves, that distinguishes the required width for the panel from the excess portion of the ribbon of staves.

11. The system of claim 1, wherein the job directions specify a required width for the at least one panel.

12. The system of claim 1, the system further programmed to oversize the plurality of wooden staves such that the width of the ribbon of staves is greater than the required width of the at least one panel.

13. A method for optimizing wood panel creation using a system comprising a computing device comprising a memory; a processor; and a module stored in the memory and executable by the processor, at least one production device comprising a first conveyor belt, a second conveyor belt, a third unit, and a fourth unit, wherein the first conveyor belt is coupled between the third unit and the fourth unit and the second conveyor belt is coupled between the fourth unit and the third unit, wherein the first conveyor belt is programmed to receive instructions at least partially based on the received information from the computing device, wherein the fourth unit is programmed to receive instructions at least partially based on the received information from the computing device, wherein the second conveyor belt is programmed to receive instructions at least partially based on the received information from the computing device, the method comprising:

receiving, by the computing device, information related to a customer order, wherein the customer order requires the production of at least one job, and wherein the information comprises job directions to produce at least one wood panel using at least one production device;
positioning, by the first conveyor belt and based on the received instructions, the ribbon of staves at the third unit and transfer the ribbon of staves to the fourth unit;
resizing, by the fourth unit and based on the received instructions, the ribbon of staves such that a panel is formed, wherein resizing the ribbon of staves comprises removing an excess portion of the ribbon of staves; and
returning, by the second conveyor belt and based on the received instructions, at least some of the excess portion of the ribbon of staves from the fourth unit to the third unit of the production device.

14. The method of claim 13, the method further comprising assembling, by the first unit and based on the received information, a plurality of wooden staves.

15. The method of claim 13, the method further comprising adhering, by the second unit and based on the received information, the plurality of wooden staves to one another such that a ribbon of staves is formed.

16. The method of claim 13, the method further comprising curing, by the fourth unit and based on the received information, the ribbon of staves.

17. A system for optimizing wood panel creation, the system comprising:
at least one production device comprising a first conveyor belt, a second conveyor belt, a third unit, and a fourth unit, wherein the first conveyor belt is coupled between the third unit and the fourth unit and the second conveyor belt is coupled between the fourth unit and the third unit;
wherein the first conveyor belt is programmed to position at the third unit and transfer the ribbon of staves to the fourth unit;
wherein the fourth unit is programmed to resize the ribbon of staves such that a panel is formed, wherein resizing the ribbon of staves comprises removing an excess portion of the ribbon of staves; and
wherein the second conveyor belt is programmed to return at least some of the excess portion of the ribbon of staves from the fourth unit to the third unit of the production device.

18. A method for optimizing wood panel creation using a system comprising at least one production device comprising a first conveyor belt, a second conveyor belt, a third unit, and a fourth unit, wherein the first conveyor belt is coupled between the third unit and the fourth unit and the second conveyor belt is coupled between the fourth unit and the third unit, the method comprising:
positioning, by the first conveyor belt, the ribbon of staves at the third unit and transferring the ribbon of staves to the fourth unit;
resizing, by the fourth unit, the ribbon of staves such that a panel is formed, wherein resizing the ribbon of staves comprises removing an excess portion of the ribbon of staves; and
returning, by the second conveyor belt, at least some of the excess portion of the ribbon of staves from the fourth unit to the third unit of the production device.

* * * * *